C. E. PATRIC.
PLANTING MACHINE.
APPLICATION FILED OCT. 2, 1909.
982,018.
Patented Jan. 17, 1911.
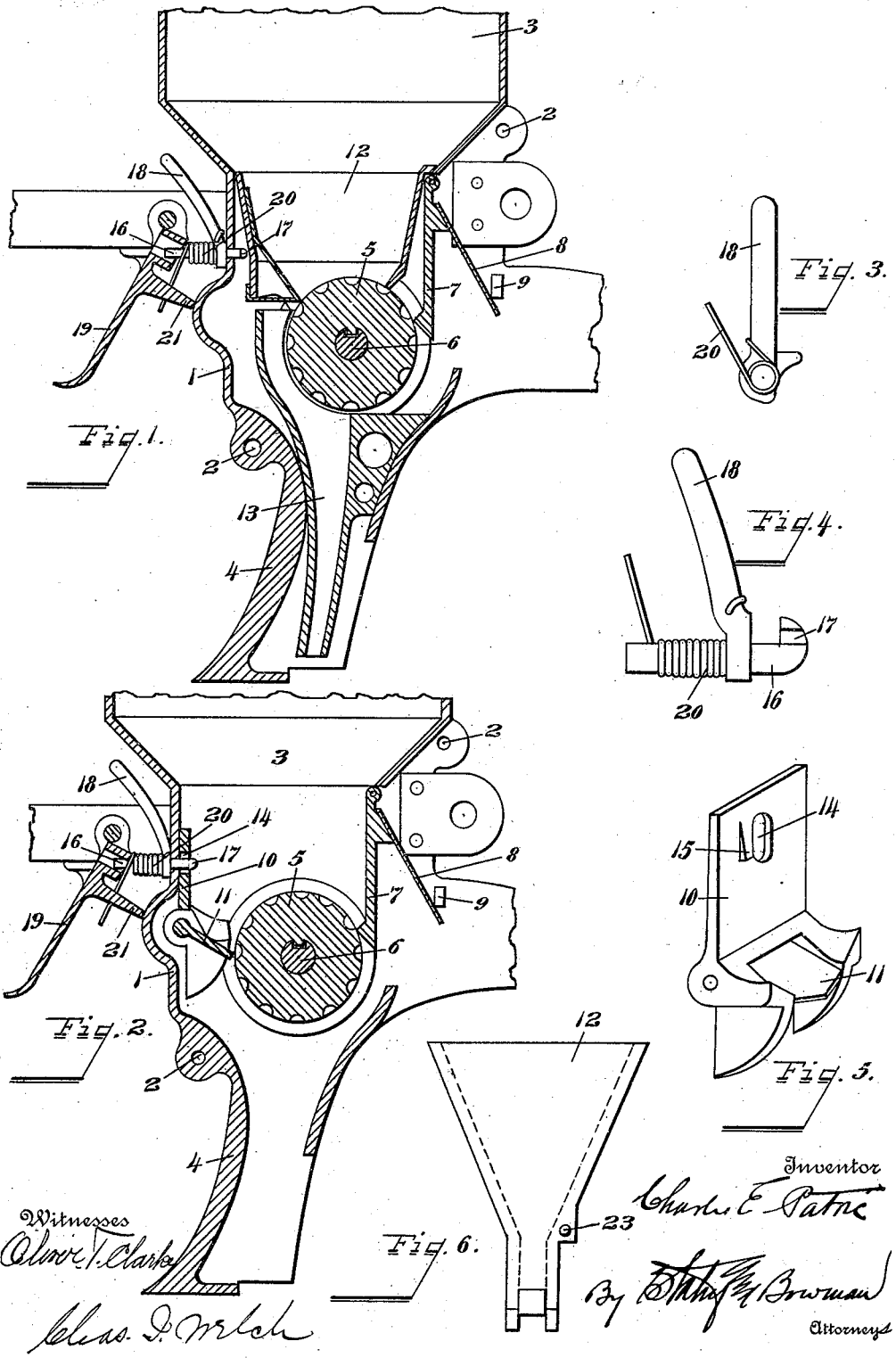

UNITED STATES PATENT OFFICE.

CHARLES E. PATRIC, OF SPRINGFIELD, OHIO.

PLANTING-MACHINE.

982,018.  Specification of Letters Patent.  Patented Jan. 17, 1911.

Application filed October 2, 1909. Serial No. 520,730.

*To all whom it may concern:*

Be it known that I, CHARLES E. PATRIC, a citizen of the United States, residing at Springfield, in the county of Clark and State of Ohio, have invented certain new and useful Improvements in Planting-Machines, of which the following is a specification.

This invention relates to improvements in planting machines and it particularly relates to improvements upon the machine set forth in my United States Patent 899,557 dated September 29th, 1908.

An object of my invention is to provide improved means for planting the finer seeds so as to cause said seeds to be fed and deposited in the furrow in a more uniform manner.

A further object of my invention is to provide for quickly and easily installing and securing in position certain of the seed feeding devices so that they may be readily removed when desired.

The invention consists in the construction and combinations of parts hereinafter described and set forth in the claims.

In the accompanying drawings, Figure 1 is a longitudinal sectional view of a portion of the machine embodying my improvements, showing the auxiliary hopper and conduit. Fig. 2 is also a longitudinal sectional view showing the check plate and valve. Figs. 3 and 4 are details of the device for securing some of the seed feeding mechanism in position. Fig. 5 is a perspective view of the check plate as set forth in my former patent referred to with some of my improvements applied thereto. Fig. 6 is an end view of the auxiliary hopper.

Like parts are represented by similar characters of reference in the several views.

The general construction and operation of the present machine is the same as that set forth in my prior patent referred to only so much of the parts of the same being shown, therefore, as are necessary to explain the operation of the improvements.

1 represents the casing or frame, which is preferably constructed in two parts connected together with suitable fastening devices at 2. The upper part of each frame portion is enlarged to form a hopper 3.

As in my former patent referred to the feeding or distributing wheel 5 is located in the casing or hopper, being splined to the operating or feed shaft 6, which derives its movement from the rear carrying wheel (not shown) in the manner described in said patent. The feed or distributing wheel is formed with a concave outer periphery and with one or more rows of pockets for the seed, located in the center of the curved portion of the wheel, the number of rows of pockets and other sizes depending on the kind of seed to be sown as explained in my co-pending application Ser. No. 541,759. As also explained in my prior patent and in the application referred to, this feed wheel is made readily removable so as to permit the substitution of other wheels. In the present machine the ends of the distributing wheel fit freely between the sides of the casing and on the rear side of the wheel there is a plate 7, pivoted at its upper end to the hopper and having its lower end shaped to conform to the curved periphery of the feed wheel so as to close the space between the casing and the wheel; a flat spring 8 attached to the plate at one end and bearing against a lug 9 at the other end serves to hold this plate firmly against the feed wheel. This yieldable plate permits the ready insertion of the interchangeable feed wheels. For the sowing of some kinds of seed, I close the space on the opposite side of the feed wheel by a check plate 10 and its yieldable gate 11, the general construction and shape of which are the same as that described in my former patent referred to. In the sowing of other kinds of seed it is desirable to remove the check plate and insert an auxiliary or sub-hopper 12, the construction and operation of which are described more fully in my co-pending application referred to, it being only necessary to state here that the hopper is so formed as to form in effect a continuation of the main hopper and has its bottom edge shaped to fit against the concave periphery of the feed wheel; a removable sub-conduit 13 been used in connection with this said hopper as explained in said application.

In order to provide means for readily substituting the sub-hopper for the check plate or vice versa I have devised the following devices which form the subject matter of this present application. Located in the upper part of the check plate is a slotted opening 14 and adjacent this slotted opening is an inclined surface 15. Extending into the casing and projecting through this slotted opening is a rod 16 having a hook-shaped end 17 within the casing and an arm or lever 18 on the outside of the casing. This rod, besides being supported by the walls of the casing, also extends through an opening in a part 19, which in the present instance is a scraper for the front carrying wheel. A spring 20 coiled about said rod with one of its ends bearing against the projection 21 on the scraper and the other against the handle or lever 18, normally tends to throw the hook-shaped end of the rod over toward locking position after the check-plate has been inserted in the casing with the hook-shaped end of the rod projecting through the slotted opening, so that the operator may by releasing the handle or lever permit the spring to force the hook-shaped end upon the beveled or inclined surface 15 and thus firmly lock the plate in position in a manner which will permit its ready removal at any time. The spring is located between the boss formed on the scraper and the lever 18 and is under compression so as to normally force the rod rearwardly into proper position to cause the hook-shaped end to engage the inclined surface on the check-plate. Projecting from the one end of the hopper is a small pin 23 over which the hook-shaped end 17 of the rod 16 is adapted to engage to hold the said hopper in the place when it has been substituted for the check plate; the bottom of said hopper being thus held in gentle contact with the periphery of the feed wheel so as to obviate any undue friction and at the same time permitting the ready insertion and removal of the hopper.

Having thus described my invention, I claim:

1. In a seed planting device, a hopper or casing, a revolving feed wheel, seed controlling devices in the seed hopper or casing coöperating with said wheel, a latch for said controlling devices to hold the same in position in said hopper or casing, and means for releasing said latch, substantially as specified.

2. In a seed planting device, a hopper or casing, a revolving feed wheel, seed controlling devices in said hopper or casing coöperating with said wheel, a spring-pressed latch for holding said controlling devices in position in said hopper or casing and means for releasing said latch, substantially as specified.

3. In a seed planting device, a hopper or casing, a revolving feeding wheel, a passageway between said hopper or casing and said wheel, a yieldable gate normally closing said passageway, a latch for holding said gate in said hopper or casing and means for releasing said latch, substantially as specified.

4. In a seed planting device, a hopper or casing, a revolving seed feeding wheel, a passageway between said hopper or casing and said wheel, a spring pressed yieldable gate normally closing said passageway, a latch for holding said gate in position in said hopper or casing, and means for releasing said latch, substantially as specified.

5. In a seed planting device, a hopper or casing, a revolving seed feeding wheel therein, a passageway between said hopper or casing and said feed wheel, a plate having a yieldable gate normally closing said passageway, a latch for holding said plate in position in said hopper or casing and means for releasing said latch, substantially as specified.

6. In a seed planting device, a hopper or casing, a feed wheel located therein, a passageway between said casing or hopper and said feed wheel, a plate having inclined faces on either side of said passageway leading thereto, said faces being also extended to said wheel and conformed to the shape thereof, a yieldable gate normally closing said passageway, said gate being pivoted to said plate, a latch for holding said plate in position in said hopper or casing and means for releasing said latch, substantially as specified.

7. In a seed planting device, a hopper or casing, a seed feeding wheel located in said hopper or casing, a passageway between said casing or hopper and said feeding wheel, a plate having a yieldable gate normally closing said passageway, an opening in said plate, an inclined surface on said plate adjacent said opening, and a spring-pressed rod extending through said casing or hopper and the opening in said plate and having a hook-shaped end to engage said inclined surface, substantially as and for the purpose specified.

8. In a seed planting device, a hopper or casing, a seed feeding wheel, seed controlling devices in said hopper located on one side of said wheel, and a yieldable plate in said hopper on the opposite side of said wheel bearing against the periphery of said wheel to close the space between said wheel and said hopper or casing, substantially a specified.

In testimony whereof, I have hereunto set my hand this 16th day of September 1909.

CHARLES E. PATRIC.

Witnesses:
CHAS. I. WELCH,
OLIVER T. CLARKE.